Sept. 13, 1955
G. F. WIKLE ET AL
2,717,628
TIRE BUILDING APPARATUS
Filed May 15, 1953
4 Sheets-Sheet 1
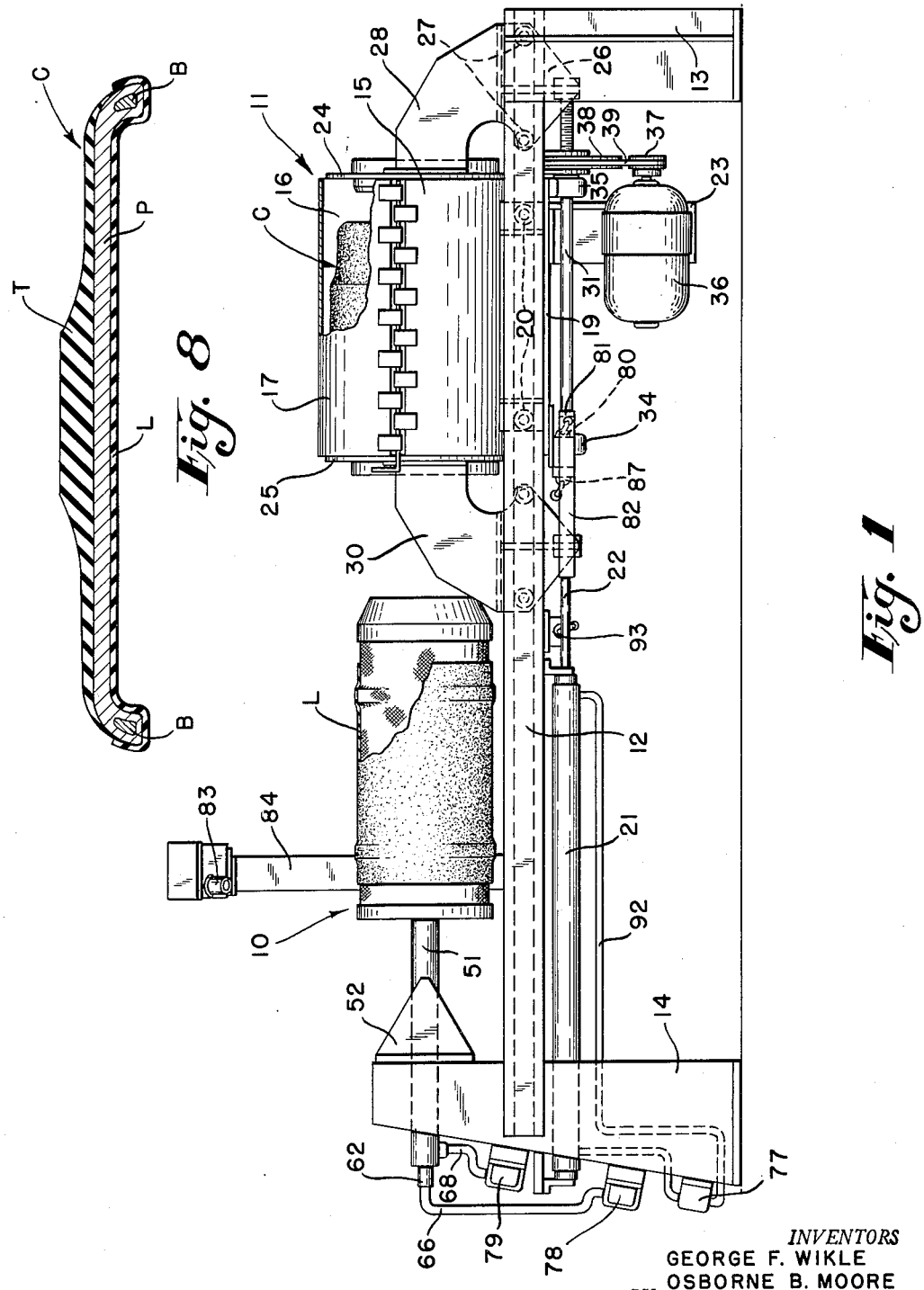
INVENTORS
GEORGE F. WIKLE
OSBORNE B. MOORE
BY ELWOOD A. STIEGLER
Irwin M. Lewis
ATTORNEY.

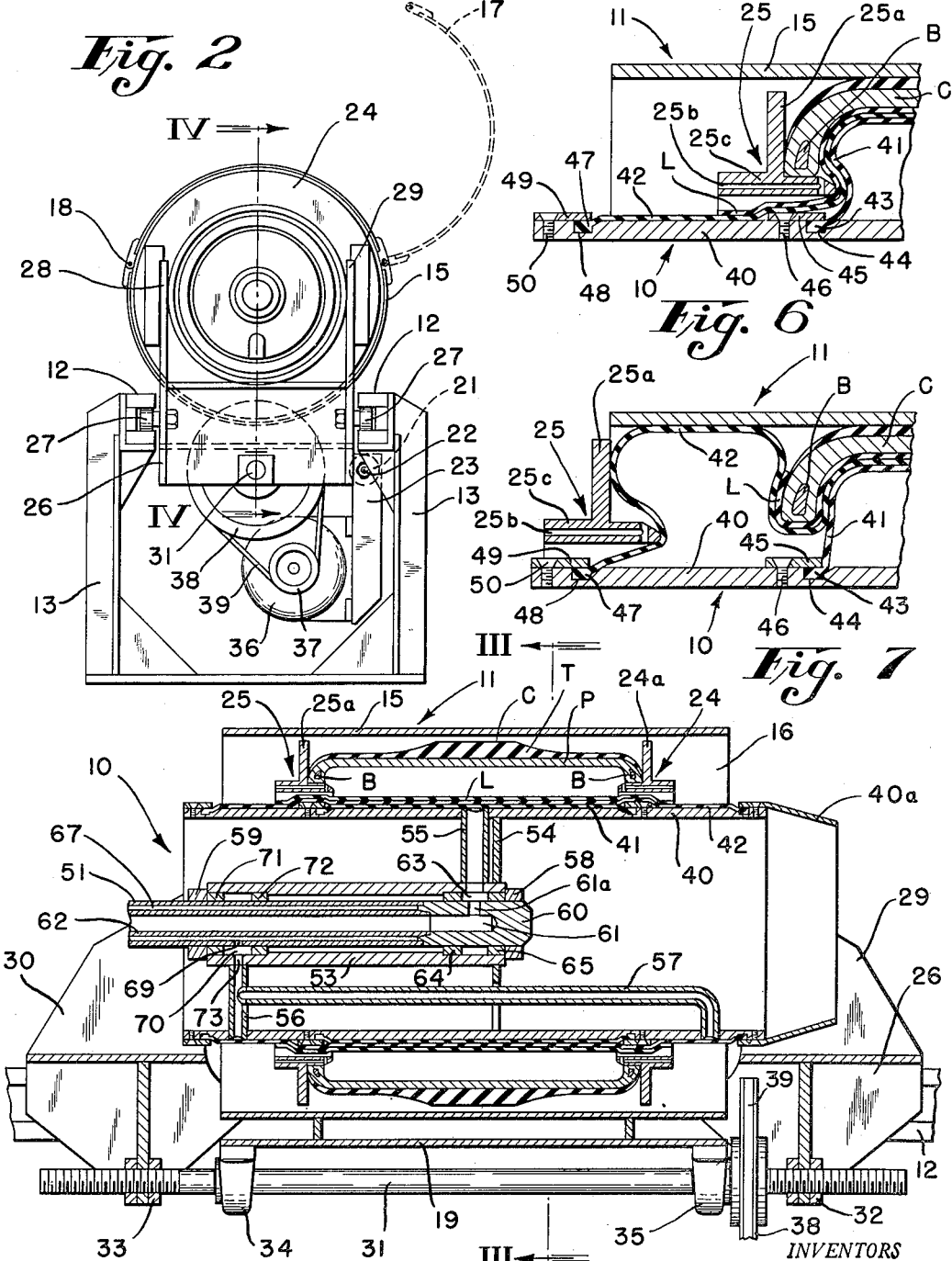

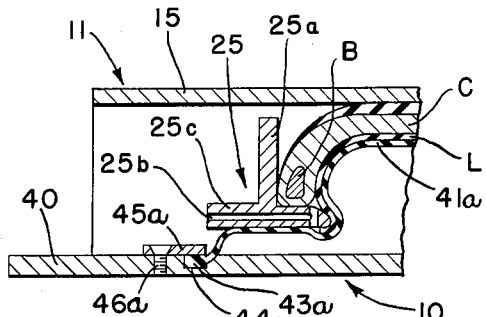
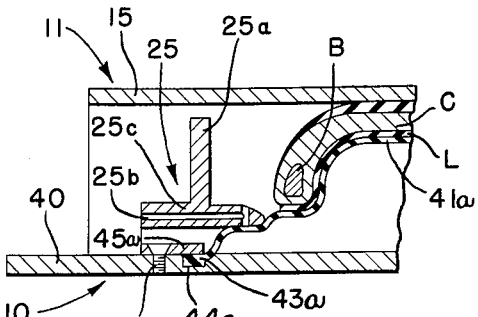
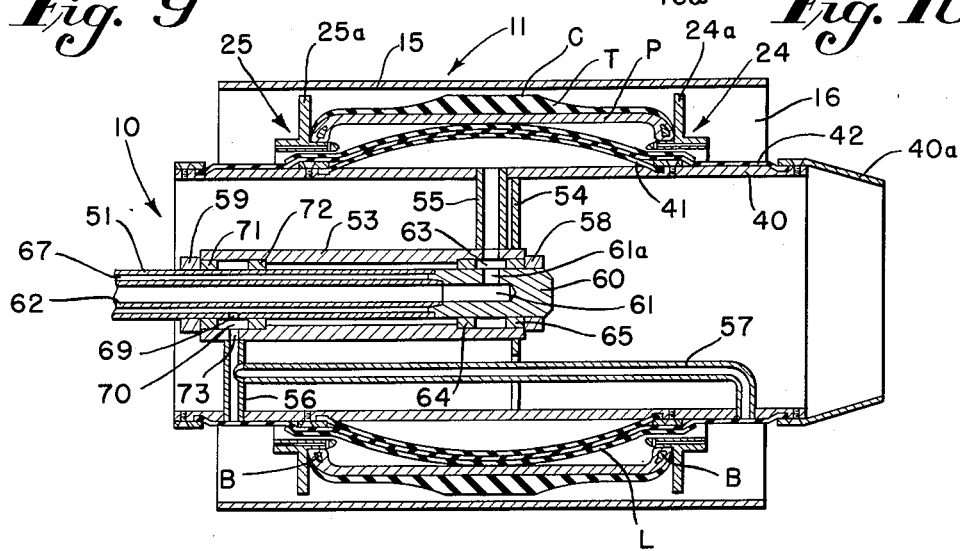
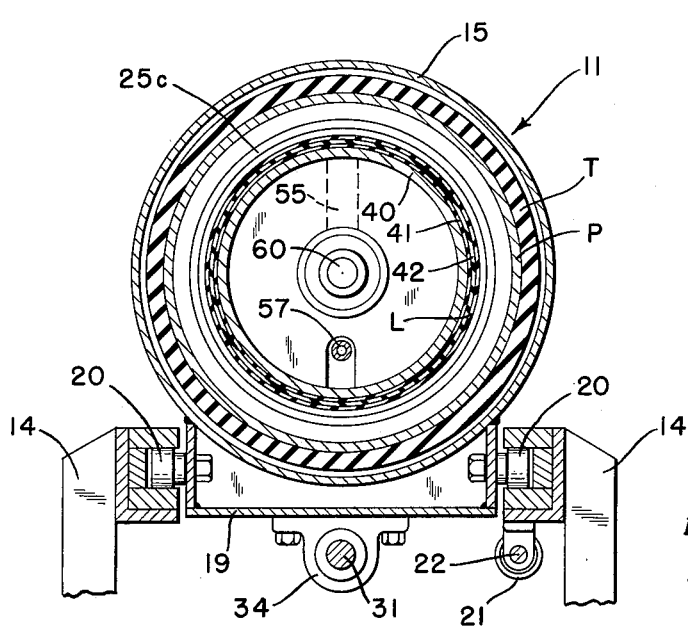

INVENTORS
GEORGE F. WIKLE
OSBORNE B. MOORE
BY ELWOOD A. STIEGLER

Irwin M. Lewis

ATTORNEY.

United States Patent Office 2,717,628
Patented Sept. 13, 1955

2,717,628

TIRE BUILDING APPARATUS

George F. Wikle and Osborne B. Moore, Detroit, and Elwood A. Stiegler, Grosse Pointe Park, Mich., assignors to United States Rubber Company, New York, N. Y., a corporation of New Jersey Application May 15, 1953, Serial No. 355,312

18 Claims. (Cl. 154—9)

This invention relates to the manufacture of tires. More particularly, the invention relates to apparatus for applying an air impervious liner to the carcass of a tubeless tire in the manufacture thereof.

A tubeless tire, as the name implies, has no inner tube. The tire casing itself in conjunction with the rim forms the air container. The beads of the tire are sealed against the flanges of the rim by the internal pressure exerted when the tire is inflated.

A tire casing manufactured in the conventional manner for use with a separate inner tube is too porous to retain the air for a sufficient time to permit it to be utilized as a tubeless tire. It is the practice, therefore, in the manufacture of tubeless tires to provide the carcass with an internal lining of a relatively air impermeable material to prevent leakage of air through the wall of the tire. This liner forms the innermost surface of the tire and often is extended around or partly around the beads of the tire. The liner is commonly made from a tacky, unvulcanized or partially vulcanized rubbery sheet and is applied during the manufacture of the tire prior to vulcanization. Preferably, the sheet is made of a Butyl rubber containing composition because of the well-known air retaining properties of Butyl rubber. Such a composition is disclosed in copending application Serial No. 301,432, filed July 29, 1952, by Lester C. Peterson and Harvey J. Batts, now abandoned.

The primary object of the present invention is to provide an efficient apparatus for applying an air impervious liner to a carcass in the manufacture of tubeless tires.

According to the present invention, the tire carcass of rubberized fabric plies and inextensible beads is fabricated on a tire building drum in the conventional manner. A liner, in band form, is formed from a desired composition either by tubing or by fabricating from a sheet of the composition. The carcass is removed from the tire building drum and the liner in band shape is inserted into the interior of the carcass. After insertion, the liner is forced against the carcass starting at the middle of the carcass and progressing toward the beads of the carcass. In this manner, entrapment of air between the liner and carcass and the defects caused thereby in the finished tire is minimized. The lateral edges of the liner are then wrapped around and adhered to the beads of the carcass. Outward expansion of the carcass is limited during the application of the liner. If desired, an adhesive may be applied to both the liner and the carcass before application of the liner, or the liner and the carcass may be specially treated to increase the tack thereof. After the liner is adhered to the carcass, the carcass with the liner therein is shaped and vulcanized in the conventional manner to form the finished tire.

The apparatus of the present invention is specially adapted to facilitate the handling of the liner and carcass and the application of the liner to the carcass without the entrapment of air therebetween. The apparatus includes an expansible drum of novel construction to which the liner is first applied and a special supporting structure for the carcass so that the drum with the liner therein may be inserted into the carcass and the drum expanded to apply and adhere the liner to the carcass. The expansible drum is specially constructed to force the liner into intimate contact with the inner surface of the carcass and to wrap the lateral edges of the liner around the beads of the carcass.

Other objects and advantages of the present invention will become apparent from the following description when read in conjunction with the accompanying drawings, wherein:

Fig. 1 is an elevational view with parts broken away of the apparatus of the present invention showing the liner carried by its expansible drum and the carcass of a tire supported in the carcass supporting structure preparatory to application of the liner to the carcass.

Fig. 2 is a right-hand end view of the apparatus of the present invention,

Fig. 3 is a sectional view taken on the line III—III of Fig. 4,

Figure 11:
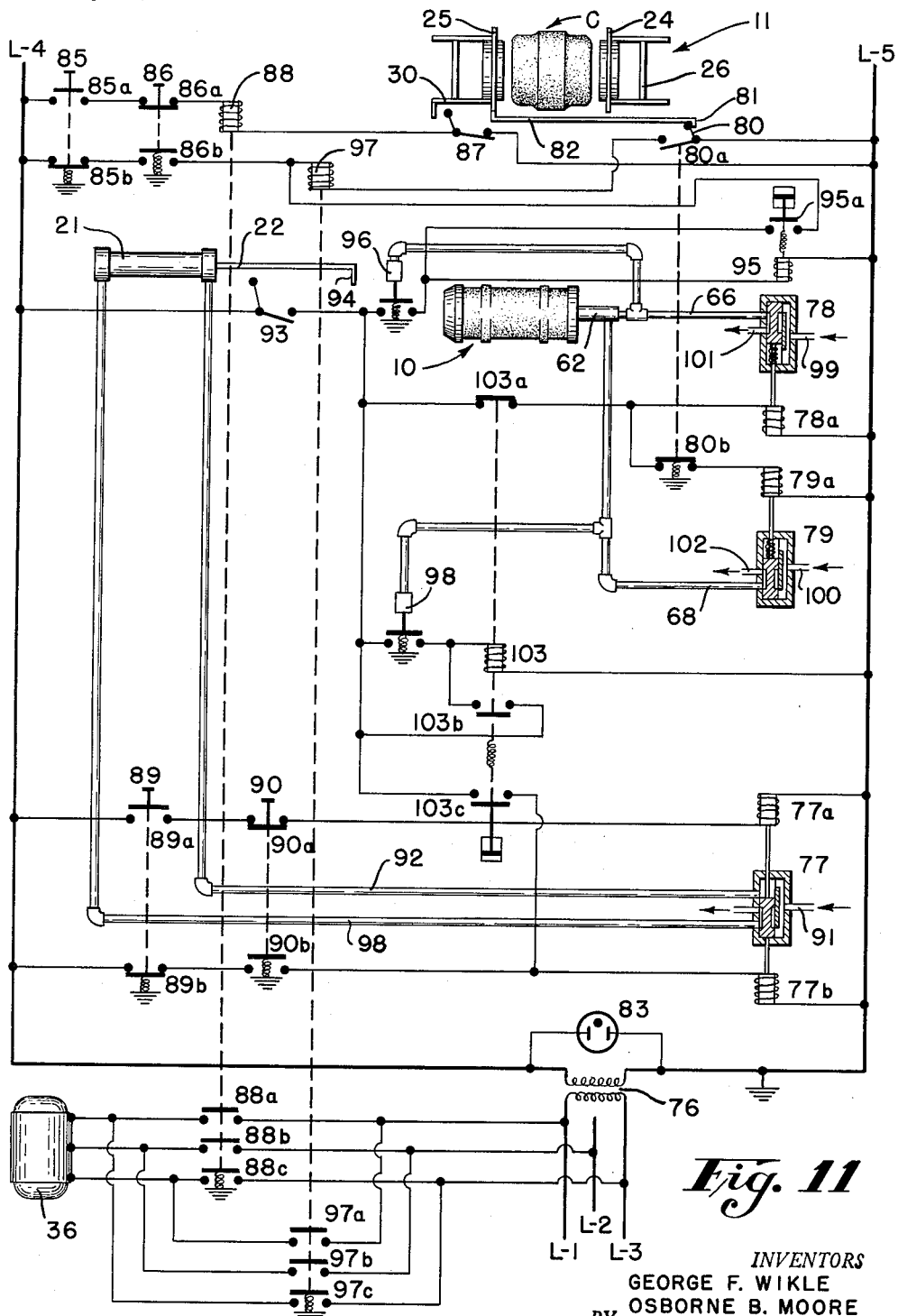

Fig. 4 is a partial sectional elevational view taken on the line IV—IV of Fig. 2 showing the expansible drum with the liner thereon inserted into a carcass of a tire preparatory to expanding the drum to apply the liner to the carcass, Fig. 5 is a sectional view, similar to that of Fig. 4, but showing the drum partially expanded, Fig. 6 is a partial sectional view showing the drum expanded a sufficient amount to apply the liner to the interior surface of the carcass, Fig. 7 is a partial sectional view showing the liner wrapped around the beads of the tire by expansion of the drum, Fig. 8 is a sectional view of the carcass with the liner applied, Fig. 9 is a partial sectional view similar to that of Fig. 6, but showing a modified form of the invention, Fig. 10 is a partial sectional view similar to that of Fig. 7, but showing a modified form of the invention, and Fig. 11 is a diagram of an electrical and fluid control system for the apparatus as shown in Fig. 1.

Referring to the drawings and particularly to Fig. 1 of the drawings, the apparatus of the present invention broadly includes an expansible drum 10 over which a liner L in band form is adapted to be placed, and a carcass support 11, open at each end, in which a tire carcass C in band form is adapted to be supported. The carcass support 11 is movable towards and over the drum 10 on spaced parallel tracks 12, to position the carcass C over the liner L carried by the drum 10 as best shown in Fig. 4. Tracks 12 are supported at each end thereof by supporting framework members 13 or 14.

In utilizing the apparatus, the tire carcass C is fabricated on a tire building drum in the conventional manner and includes as best shown in Fig. 4 and Fig. 8, plies of rubberized fabric P, inextensible beads B, and a layer of tread and sidewall stock T. The unvulcanized carcass C in band form is removed from the tire building drum and supported in the carcass support 11. A liner L of suitable air impervious stock is then placed on the expandable drum 10 and the carcass support 11 is moved towards the drum 10 until the carcass supported thereby surrounds the liner L carried by the drum 10. The drum 10 is then expanded radially to press and adhere the liner L to the carcass C. Thereafter, the carcass with the liner adhered thereto as shown in Fig. 8, is shaped and vulcanized in a tire mold in the conventional manner to form the finished tire.

The structure and operation of the apparatus of the present invention having been broadly described above, a detailed description of the component parts thereof is given hereafter.

Carcass support

The carcass support 11 includes a cylindrical shaped housing 15 providing a cylindrical shaped chamber 16, open at each end, in which the carcass C is adapted to be supported. The housing 15 is provided with a hinged cover 17 (Figs. 1 and 2) to facilitate the placement of the carcass C within the chamber 16. When closed, the cover 17 is locked by a suitable latch 18. The housing 16 serves to limit the outward expansion of the carcass C when the liner L is pressed against the carcass as the drum 10 is expanded so that the liner will be firmly adhered to the carcass.

The housing 15 is mounted on a carriage 19 (Figs. 1, 3 and 4) which is supported on the tracks 12 by rollers 20 so that the carriage 19 with the housing 15 mounted thereon can be moved towards and away from the drum 10. Movement of the carriage 19 and the housing 15 supported thereby toward and away from the drum 10 is effected by a fluid actuated cylinder 21 which is secured to the tracks 12 adjacent the drum 10. The piston rod 22 of the cylinder 21 is attached at its end to a bracket 23 secured to and extending down from the carriage 19. Admission of fluid under pressure to the cylinder 21, therefore serves to move the carriage 19 and housing 15 carried thereby towards and away from the drum 10.

As best shown in Fig. 4, the carcass C is initially supported in the chamber 16 of the housing 15 by flanged bead supporting rings 24 and 25 mounted respectively at each end of the chamber 16. The bead supporting rings 24 and 25 serve to position, center and support the carcass C within the chamber 16 by the beads thereof and radially extending flanges 24a and 25a of the rings 24 and 25 retain the beads against axial movement during the initial application of the liner L to the carcass C as will hereinafter be described in detail. Passageways 24b and 25b through the radially extending supporting flanges 24c and 25c respectively provide for venting of air from between the liner L and the carcass C in the region of beads as the liner L is applied. The lower edges of the flanges 24c and 25c are tapered to facilitate entry thereof into the carcass C.

Bead supporting ring 24, as best shown in Figs. 1, 2 and 4 is supported on a carriage 26 which is mounted for axial movement toward and away from the housing 15 on tracks 12 by means of rollers 27. The bead supporting ring 24 is secured to the carriage 26 by overhanging spaced plate brackets 28 and 29 so that the ring 24 may enter the chamber 16 a substantial distance. Bead supporting ring 25 is similarly mounted on a movable carriage 30 at the other end of the chamber 16. The rings 24 and 25 are moved axially towards and away from each other to engage and support carcass C by the beads B as shown in Fig. 4, by rotation of a shaft 31 which is oppositely threaded at each end. One end of the shaft 31 threads into a nut 32 secured to the carriage 26 and the other end thereof threads into nut 33 secured to the carriage 30. Rotation of the shaft 31 in one direction, therefore, serves to move the carriages 26 and 30 and the bead supporting rings 24 and 25 carried thereby toward each other and rotation of the shaft 31 in the other direction serves to move them apart.

The shaft 31 is rotatably mounted in spaced bearings 34 and 35 secured to the bottom of the housing supporting carriage 19 and is rotated by means of a motor 36 also secured to the bottom of the carriage 19 by means of bracket 23. A driving connection is provided between the shaft 31 and the motor 36 by a pulley 37 secured to the drive shaft of the motor 36, a pulley 38 connected to the shaft 31 and a belt 39.

It will be noted that the carriages 26 and 30 with the bead supporting rings 24 and 25 mounted thereon and the carriage 19 with the housing 15 mounted thereon are movable as a unit towards the drum 10 by admission of fluid under pressure to the cylinder 21 to position the carcass C supported thereby around the liner L carried by the drum 10.

Expansible drum

The expansible drum 10, which is adapted to support the liner L and over which the housing 15 is adapted to be moved to position the carcass C over the liner L, includes a rigid cylinder 40 (Fig. 4) and two cylindrical shaped, elastic, expansible diaphragms 41 and 42 which surround and are secured at their lateral edges to the external surface of the cylinder 40.

The diaphragms 41 and 42 are made from any suitable material such as rubber, synthetic rubber, or rubberlike plastics which will retain air and which is sufficiently elastic to permit expansion and contraction of the diaphragms.

It will be noted from Figs. 4, 5, 6 and 7 that the innermost diaphragm 41 has an unstretched axial length approximately equal to the distance between the beads B of the carcass C and as will hereinafter be described in detail serves to force the liner L against the interior surface of the carcass C as shown in Figs. 5 and 6. The outermost diaphragm 42, has an axial length substantially greater than that of the innermost diaphragm 41 and serves to wrap and adhere the lateral edges of the liner L around the bead portions B of the carcass C, after the bead supports 24 and 25 have been moved away from the beads B of the carcass C as shown in Fig. 7.

The lateral edges of the diaphragm 41 are provided with integral, substantially rectangular beads 43 which seat in annular grooves 44 formed in the exterior surface of the cylinder 40 and are retained therein to form an air-tight seal by means of straps 45 and screws 46. Diaphragm 42 is similarly provided with integral beads 47 which seat in annular grooves 48 and are retained therein by straps 49 and screws 50. A frusto-conical shield or pilot 42a secured to the end of cylinder 40 facilitates the application of the liner L in tube form over the drum 10.

As best shown in Figs. 1, 4 and 5, the drum 10 is rotatably mounted in axial alignment with the housing 15 on the end of a horizontally extending shaft 51. The shaft 51 is supported at its other end from an upwardly extending extension of the supporting framework member 14 by means of a bracket 52. Rotation of drum 10 facilitates the placement of a liner on the drum and the fabrication of a liner directly thereon from sheet stock. Suitable means (not shown) for turning the drum can be provided if desired.

The drum 10 is rotatably supported on the end of the shaft 51 by means of a sleeve 53 which is secured to the rigid cylinder 40 by means of a plate 54 and conduits 55, 56, and 57. Conduits 55, 56 and 57 serve, as will hereinafter be described in detail, to admit fluid under pressure between the rigid cylinder 40 and the elastic diaphragms 41 and 42 to expand the diaphragms. The sleeve 53 is retained on the shaft 51 by means of retaining rings 58 and 59.

The shaft 51 has secured to the end thereof a cap 60. Cap 60 has a passageway 61 forming an extension of a pipe 62 which is supported in the interior of the shaft 51 and spaced from the interior wall thereof. The cap 60 is provided with an opening 61a which communicates with an annular passageway 63 formed by spacer rings 64 and 65 carried by the sleeve 53. Conduit 55 communicates with the annular passageway 63 so that fluid under pressure admitted through the pipe 62 is introduced between the rigid cylinder 40 and the innermost diaphragm 41 to expand the diaphragm 41 to press the liner L against the interior surface of the carcass C as shown in Figs. 5 and 6. Pipe 62 is connected to a source of fluid under pressure (not shown) by a conduit 66 as shown in Fig. 1.

Fluid under pressure is admitted to the space 67 between the shaft 51 and the pipe 52 by a conduit 68 (Fig. 1) and from space 67 is admitted to conduits 56 and 57 through opening 69 in the wall of the shaft 51 (Fig. 3), annular passageway 70 formed by spacer rings 71 and 72, and an opening 73 through the sleeve 53. Fluid under pressure so admitted to the conduits 56 and 57 is introduced between the outermost diaphragm 42 and the ends thereof and the rigid cylinder 40 to expand the diaphragm 42 to wrap the lateral edges of the liner L around the beads B of the carcass C as shown in Fig. 7 after the bead supporting rings 24 and 25 have been moved away by rotation of shaft 31.

It will be noted that this structure for admitting the fluid under pressure to the diaphragms 41 and 42 provides a rotary coupling permitting admission of fluid under pressure from a stationary fluid pressure source to the drum 10 which is rotatably mounted.

Control system and operating cycle

An electrical and fluid control system for the apparatus as above-described is schematically shown in Fig. 11. The complete electrical circuit includes a three-wire 440 volt power circuit L1, L2, L3, and a two-wire 110 volt control circuit L4, L5. The two-wire circuit L4, L5, derives its electrical energy from the three-wire power circuit L1, L2, L3 by means of a transformer 76.

In Fig. 11, all solenoids are shown in a non-energized condition. The reversing valve 77 for admitting fluid under pressure to the cylinder 21 has two solenoids 77a and 77b, one for shifting the valve each way. To shift the valve it is necessary to de-energize one solenoid and energize the other. Merely de-energizing one solenoid will not shift the valve. Valves 78 and 79 which control the admission of fluid under pressure for inflating and deflating the diaphragms 41 and 42 are spring-biased to shift when their solenoids are de-energized.

On initial operation of the apparatus, the carcass support 11 is in its extreme position from the drum 10 and the bead supporting rings 24 and 25 in their most remote position as shown in Fig. 1. A limit switch 80 is actuated so that its normally closed contacts 80a are open and its normally open contacts 80b are closed. Limit switch 80 is secured to the bottom of the carriage 19 which supports the housing 15 and is actuated by a block 81 secured to the end of an arm 82 which is attached to and extends from the carriage 30 which supports the bead supporting ring 25.

Preparatory to initiating a cycle of operations, the operator applies a liner L around the drum 10. A light source 83 secured to an arm 84 (Fig. 1) directs a thin beam of light onto the drum 10. The point of impingement of the light beam on the drum provides a gauge point to facilitate proper positioning of the liner L on the drum 10. After placing the liner L on the drum 10, the operator next places a previously fabricated carcass C into the chamber 16 of the housing 15 and presses push switch 85 to close normally open contacts 85a thereof and open normally closed contacts 85b.

Closing the contacts 85a completes a circuit through closed contacts 86a of a push switch 86 and closed contacts of a limit switch 87 to energize a motor control relay solenoid 88. Energization of solenoid 88 closes normally open contacts 88a, 88b, and 88c to complete a circuit to the motor 36 to start rotation thereof in a direction to move the bead supporting rings 24 and 25 toward each other. The operator continues to press push switch 85 until the beads B of the carass C are engaged and supported by the bead supporting rings 24 and 25. If the operator should continue to press the push switch 85 too long, a limit switch 87 will be actuated to open the normally closed contacts thereof to break the circuit to the solenoid 88 so that it is de-energized and contacts 88a, 88b and 88c open to stop motor 36. This prevents accidental jamming of the machine. Limit switch 87 is also secured to the bottom of carriage 19 and actuated by a block secured to carriage 30.

The operator next presses push switch 89 to close normally open contacts 89a thereof and open normally closed contacts 89b. The closing of contacts 89a completes a circuit through normally closed contacts 90a of a push switch 90 to energize solenoids 77a of valve 77. Energization of solenoid 77a shifts the slide of valve 77 to admit fluid under pressure from conduit 91 to conduit 92 which is connected to the forward end of cylinder 21. Conduit 91 is connected to a source of fluid under pressure (not shown). Admission of fluid under pressure to the forward end of cylinder 21 retracts the piston rod 22 thereof to shift the carcass support 11 with the carcass C supported therein to the left until it surrounds the drum 10 as shown in Fig. 4. When the carcass support 11 is in proper position over the drum 10, a limit switch 93 is actuated. Limit switch 93 is secured to the bottom of one of the tracks 12 and is actuated by a block 94 secured to the piston rod 22.

Actuation of limit switch 93 closes the normally open contacts thereof to complete a circuit through normally closed contacts 103a of a relay switch 103 to energize the solenoid 78a of valve 78. Energization of solenoid 78 shifts the slide of valve 78 to admit fluid under pressure from conduit 99 to conduits 66, 62 and conduit 55 (Fig. 4) to thereby introduce fluid under pressure between the rigid cylinder 40 and the innermost diaphragm 41 to inflate and expand the diaphragm 41. As shown in Fig. 5 the liner L is pressed initially against the center of the carcass C on initial inflation of the diaphragm 41 and as the diaphragm 41 is further inflated the liner is progressively pressed against the carcass C from the center thereof toward the bead portions B. In this manner, it is insured that no air is trapped between the liner and the carcass. As shown in Figs. 5 and 6, the radially extending flanges 24a and 25a of the bead supporting rings 24 and 25 support the beads B of the carcass C and prevent axial movement thereof during the application of the liner L to the inner side thereof.

When the innermost diaphragm 41 has reached a predetermined pressure, preferably 25 per square inch, a pressure actuated switch 96 is actuated to close the contacts thereof to complete a circuit through the closed contacts of limit switch 93 and contacts 80a of limit switch 80 which were closed when the bead supporting rings 24 and 25 were moved together, to energize a solenoid 95. Energization of solenoid 95 initiates the closing of contacts 95a. Contacts 95a are, however, provided with a dash pot which delays the closing of these contacts for about five seconds to permit the inner diaphragm 41 to properly press the liner L against the carcass C without the entrapment of air therebetween. After the time delay of approximately five seconds, the contacts 95a close to complete a circuit through the contacts of limit switch 93, pressure switch 96 and contacts 80a of limit switch 80 to energize a motor control relay solenoid 97. Energization of solenoid 97 closes normally open contacts 95a, 97b, and 97c to complete a circuit to motor 36 to rotate the motor in a direction to move the bead supporting rings 24 and 25 apart as shown in Fig. 5. When the bead supporting rings 24 and 25 reach their most remote position apart, limit switch 80 is again actuated to open the closed contacts 80a thereof to de-energize motor control relay solenoid 97 to open contacts 97a, 97b, and 97c to thereby stop rotation of motor 36. At the same time contacts 80b of limit switch 80 close to complete a circuit through the closed contacts of limit switch 93 and contacts 103a of a control relay 103 to energize solenoid 79a of valve 79. Energization of solenoid 79a shifts the slide of valve 79 to admit fluid under pressure from conduit 100 through conduit 68, passageway 67, opening 69, passageway 70, opening 73, conduits 56 and 57 to thereby introduce fluid under pressure between the cylinder 40 and the outermost diaphragm 42 adjacent the lateral edges thereof to expand the diaphragm 42 so that it wraps and adheres the lateral edges of the liner L around and to the bead portions B of the carcass C as shown in Fig. 7.

When the pressure in the outer diaphragm 42 increases to a predetermined pressure, preferably five pounds per square inch, a pressure actuated switch 98 is actuated to close the contacts thereof to complete a circuit through the closed contacts of limit switch 93 to energize the control relay solenoid 103. Energization of solenoid 103 instantly closes contacts 103b, opens contacts 103a and permits contacts 103c to close after a time delay of approximately 3 seconds. Contacts 103c are provided with a dash pot to give the desired time delay. Closing of contacts 103b provides a holding circuit around pressure switch 98. Opening of contacts 103a breaks the circuit to the solenoids 78a and 79a of valves 78 and 79 so that the slides thereof shift to exhaust the fluid from the diaphragms 41 and 42 through exhaust ports 101 and 102 in the valves 78 and 79. The time delay in the closing of the contacts 103c permits the diaphragms 41 and 42 to completely deflate before the carcass support 11 is moved away from the drum 10. Closing of contacts 103c completes a circuit through the closed contacts of limit switch 93 to energize the solenoid 77b of the valve 77 to shift the slide thereof to admit fluid under pressure through conduit 98 to the cylinder 21 to extend the piston rod 22 thereof to move the carcass support 11, with the carcass C supported therein, away from the drum 10. After the carcass support 11 has moved to the position shown in Fig. 1, the cover 17 is unlatched and the carcass with the liner adhered thereto is removed therefrom and shaped and vulcanized to form the finished tire in the conventional manner.

As the carcass support 11 moves away from the drum 10, limit switch 93 is released thereby de-energizing solenoids 103, 77 and 77b so that the circuit is again in condition for another cycle of operations.

*Modification*

In Figs. 9 and 10, there is shown a modification of the apparatus of Fig. 1, which may be used if it is desired to wrap the lateral edges of the liner L only a short distance around the beads B of the carcass C.

In this modification, the outer diaphragm 42 is eliminated and a single diaphragm 41a similar to the diaphragm 41 of Fig. 4, but of a substantially greater axial length than the carcass is used. The diaphragm 41a is secured to the cylinder 40 in a similar manner as was the diaphragm 41 by means of rectangular integral beads 43a which are held in grooves 44a by strap 45a and screws 46a.

The carcass C is initially supported on the bead supporting rings 24 and 25 and the diaphragm 41a expanded to press the liner L against the inner surface of the carcass C as shown in Fig. 9. Trapped air is vented through passageways 25b. Thereafter, the bead rings 24 and 25 are moved away from the beads B of the carcass C so that the inflated diaphragm 41a can wrap the liner L around and press the liner L against the beads B as shown in Fig. 10.

A suitable control system for the modification of Figs. 9 and 10 is provided by eliminating valve 79 and pressure switch 98 of the control system of Fig. 11 and providing a time delay on the opening of contacts 103a so that the diaphragm 41a will remain inflated for sufficient time to press the liner L against and around the beads B after the bead supporting rings 24 and 25 have been moved away from the beads B. The time delay in the closing of contacts 103c is increased accordingly to permit complete deflation of the diaphragm 41a before the carcass support 11 is moved away from the drum 10.

From the above description it can be seen that there is provided a novel apparatus for efficiently applying a liner to a tire carcass. While the apparatus has been described for use in applying an air impervious liner to a tire carcass in the manufacture of tubeless tires, it is to be understood that it may be used for applying other types of liners to tire carcasses, including layers of puncture sealing composition.

While a preferred form of the invention has been described and shown in the drawings, it is to be understood that variations therein may be made without departing from the scope and spirit of the invention.

Having thus described our invention, what we claim and desire to protect by Letters Patent is:

1. Apparatus for applying a liner to a tire carcass comprising, a cylindrical drum over which the liner and the carcass is adapted to be placed with the carcass surrounding the liner, means spaced radially from said drum for supporting the carcass by the bead portions thereof and means carried by said drum for forcing said liner radially outwardly against the carcass to adhere said liner to said carcass.

2. Apparatus for applying a liner to a tire carcass comprising, a cylindrical drum over which the liner and the carcass is adapted to be placed with the carcass surrounding the liner, means spaced radially from said drum for supporting the carcass by the bead portions thereof and for preventing axial movement of said bead portions, and means carried by said drum for forcing said liner radially outwardly against the carcass to adhere said liner to said carcass.

3. Apparatus for applying a liner to a tire carcass having bead portions comprising, a cylindrical drum over which the liner and carcass is adapted to be placed with the carcass surrounding the liner, means carried by said drum for forcing said liner radially outwardly against the carcass to adhere said liner to the interior surface of said carcass, means spaced radially from said drum for supporting and limiting axial movement of the bead portions of the carcass while the liner is being adhered to the interior surface thereof, and means for moving said bead supporting means away from said carcass and means for wrapping the lateral edges of said liner around said bead portions after said bead supporting means are moved away.

4. Apparatus for applying a liner to a tire carcass comprising, a cylindrical drum around which a liner and carcass is adapted to be placed with the carcass surrounding the liner, the external surface of the drum being formed by a first cylindrical, radially expansible diaphragm surrounding and secured at its lateral edges to said drum, and a second cylindrical, radially expansible diaphragm of substantially greater axial length than said first diaphragm surrounding said first diaphragm and secured at its lateral edges to said drum, means for raidally expanding said first diaphragm to force said liner against the inner surface of the carcass, and means for expanding said second diaphragm to wrap the lateral edges of said said liner around and against the bead portions of the carcass.

5. Apparatus for applying a liner to a tire carcass comprising a cylindrical drum having superimposed cylindrical, radially expansible diaphragms surrounding and secured at their lateral edges thereto over which a liner and carcass is adapted to be placed with the carcass surrounding the liner, the outermost diaphragm having a substantially greater axial length than the innermost diaphragm, means for radially expanding the innermost diaphragm to force said liner against the interior surface of the carcass, and means for expanding said outermost diaphragm to wrap the lateral edges of said liner around and against the bead portion of the carcass.

6. Apparatus for applying a liner to a tire carcass comprising, a cylindrical drum, a cylindrical, radially expansible diaphragm surrounding and secured at its lateral edges to said drum over which the liner and carcass is adapted to be placed, means spaced radially from said drum for supporting the carcass by the bead portions thereof, and means for introducing fluid under pressure between the drum and diaphragm to expand the diaphragm radially to thereby force said liner against the carcass to adhere said liner to said carcass.

7. Apparatus for applying a liner to a tire carcass comprising, a cylindrical drum, a cylindrical, radially expansible diaphragm surrounding and secured at its lateral edges to said drum, means spaced radially from said drum for supporting the carcass by the bead portions thereof, means surrounding said drum spaced from said drum for limiting outward radial expansion of said carcass, and means for expanding said diaphragm radially to thereby force said liner against said carcass to adhere said liner to said carcass.

8. Apparatus for applying a liner to a tire carcass comprising, a cylindrical drum having two superimposed cylindrical, radially expansible diaphragms surrounding and secured at their lateral edges thereto over which the liner and carcass is adapted to be placed with the carcass surrounding said liner, the outermost diaphragm being of a substantially greater axial length than the innermost diaphragm, means for radially expanding said innermost diaphragm to force said liner against the inner surface of the carcass, means spaced radially from said drum for supporting and limiting axial movement of the bead portions of the carcass while the liner is being forced against the inner surface of the carcass, means for moving said bead supporting means away from said bead portions and means for expanding said outermost diaphragm to wrap the lateral edges of said liner around and against the bead portions of the carcass after said bead supporting means have been moved away.

9. Apparatus for applying a liner to a tire carcass comprising, a pair of spaced, ring shaped supporting members for supporting a carcass by the beads thereof, a radially expansible drum over which a liner is adapted to be placed, said drum when unexpanded having a diameter less than the inner diameters of said ring shaped supporting members, means for effecting relative movement between said drum and said bead supporting members whereby the drum with the liner thereon may be inserted within the tire carcass supported by said bead supporting members, and means for expanding said drum radially to press said liner against the interior surface of said carcass.

10. Apparatus for applying a liner to a tire carcass comprising, a pair of spaced ring shaped supporting members for supporting a carcass by the beads thereof, a housing adapted to surround said carcass when supported on said rings and limit radially outwardly expansion of the carcass, an expansible drum around which a liner is adapted to be placed, said drum having a diameter when unexpanded less than the inner diameters of said ring shaped supporting members, means for effecting relative movement between said drum, said housing and said bead supporting members whereby the drum with the liner thereon can be inserted within the tire carcass supported by said supporting members, and means for expanding said drum to force said liner against the interior surface of said carcass to adhere said liner thereto.

11. Apparatus for applying a liner to a tire carcass comprising, a housing providing a cylindrical chamber, a pair of bead supporting rings mounted one at each end of said cylindrical chamber and movable axially toward and away from each other, means for moving said bead supporting rings axially toward each other to support the carcass by the bead portions thereof in said cylindrical chamber, an expansible cylindrical drum around which a liner is adapted to be placed, said drum having a diameter when unexpanded less than the inner diameters of said bead supporting rings, means for effecting relative movement between said drum with the liner thereon and said housing with the carcass supported therein whereby the drum with the liner thereon is inserted within said carcass, means for expanding said drum to force said liner against the interior surface of said carcass and means for moving said bead supporting rings axially away from each other.

12. Apparatus for applying a liner to a tire carcass comprising a housing having a cylindrical chamber therein open at each end, a pair of bead supporting rings mounted one at each end of said cylindrical chamber for movement axially toward and away from each other and adapted to support a carcass in said cylindrical chamber by the beads thereof, a removable cover for said housing to permit placing of said carcass in said cylindrical chamber, means for moving said bead supporting rings axially toward each other to support said carcass by its beads in said chamber, an expansible drum over which a liner is adapted to be placed, said drum having a diameter when unexpanded less than the inner diameters of said bead supporting rings, means for effecting relative movement between said drum with the liner thereon and said housing with the carcass supported therein whereby the drum with the liner thereon is inserted into said carcass, means for expanding said drum to force said liner against the interior surface of said carcass, and means for moving said bead supporting rings axially away from each other.

13. Apparatus for applying a liner to a tire carcass comprising, a housing having a cylindrical chamber, a pair of bead supporting rings mounted one at each end of said cylindrical chamber for movement toward and away from each other, means for moving said bead supporting rings axially toward each other to support a carcass thereon by the bead portions thereof, an expansible drum over which the liner is adapted to be placed, said drum having a diameter when unexpanded less than the inner diameters of said bead supporting rings, means for effecting relative movement between said housing with the carcass supported in the cylindrical chamber thereof and said drum with the liner thereon whereby said drum with the liner thereon may be inserted within said carcass supported in said cylindrical chamber of said housing, means carried by said drum for forcing said liner radially outwardly against said carcass, means for moving said bead supporting rings away from the beads of said carcass, and means carried by said drum for wrapping the lateral edges of the liner around the beads of said carcass after said bead supporting rings have been moved away from said beads.

14. Apparatus for applying a liner to a tire carcass comprising, a housing having a cylindrical chamber therein opened at each end, means at each end of said chamber for supporting a carcass in said chamber by the beads thereof, a cylindrical drum, a cylindrical radially expansible diaphragm surrounding and secured at its lateral edges to said drum over which the liner is adapted to be placed, said drum and diaphragm having a diameter when unexpanded less than the inner diameter of said carcass supporting means and said cylindrical chamber, means for effecting relative movement between said drum with the liner thereon and said housing with the carcass supported in the cylindrical chamber thereof whereby the drum with the liner thereon may be inserted within said carcass, and means for introducing fluid under pressure between the drum and diaphragm to expand the diaphragm radially to thereby force said liner against said carcass to adhere said liner to said carcass.

15. Apparatus for applying a liner to a tire carcass comprising, means for supporting a liner within a carcass, means for pressing said liner against the interior surface of the carcass at the center of said carcass and progressively toward the lateral edges of the carcass to thereby prevent entrapment of air between the liner and the carcass and means for wrapping the lateral edges of the liner around the beads of the carcass.

16. Apparatus for applying a liner to a tire carcass comprising, a housing having a cylindrical chamber, a pair of bead supporting rings mounted adjacent each end of said cylindrical chamber for movement towards and away from each other, means for moving said bead supporting rings axially towards each other to support a carcass thereon by the bead portions thereof, a cylindrical drum, a cylindrical radially expansible diaphragm surrounding and secured at its lateral edges to said drum over which the liner is adapted to be placed, said cylindrical drum and diaphragm having a diameter when unexpanded less than the inner diameters of said bead supporting rings, means for effecting relative movement between said drum with the liner thereon and said housing with the carcass supported in the cylindrical chamber thereof whereby the drum with the liner thereon may be inserted within said carcass, means for introducing fluid under pressure between the drum and diaphragm to expand the diaphragm radially to thereby force said liner against said carcass to adhere said liner to said carcass, and means for moving said bead supporting rings away from the beads of the carcass after an interval of time so that the diaphragm may press said liner against the beads of said carcass.

17. Apparatus for applying a liner to a tire carcass comprising, a housing having a cylindrical chamber, a pair of bead supporting rings mounted one at each end of said cylindrical chamber for movement towards and away from each other, each of said rings having an axially extending flange on which the beads of the carcass are adapted to be supported and a radially outwardly extending flange for preventing axial movement of the beads of the carcass, means for moving said bead supporting rings axially towards each other to support a carcass in said cylindrical chamber by the bead portions thereof on the radially axially extending flanges of the bead supporting rings, an expansible drum over which a liner is adapted to be placed, said drum having a diameter less than the inner diameters of said rings, and means for expanding said drum to press said liner against the interior surface of said carcass while it is supported in said cylindrical chamber by said bead supporting rings.

18. Apparatus for applying a liner to a tire carcass comprising, a housing having a cylindrical chamber, a pair of bead supporting rings mounted one at each end of said cylindrical chamber for movement towards and away from each other, each of said rings having an axially extending flange on which the beads of the carcass are adapted to be supported and radially extending flanges for preventing axial movement of the beads, an expansible drum over which a liner is adapted to be placed, said drum having a diameter less than the inner diameters of said rings, means for expanding said drum to press the liner against the interior surface of said carcass while it is supported in said cylindrical chamber by said bead supporting rings and passageways through said bead supporting rings to permit venting of air from between the liner and the carcass as the liner is applied to the carcass.

References Cited in the file of this patent

UNITED STATES PATENTS

| | | |
|---|---|---|
| 2,517,889 | Kuffler | Aug. 8, 1950 |
| 2,565,071 | Frazier | Aug. 21, 1951 |